Nov. 4, 1958 W. P. NIBLICK 2,859,362
VIBRATORY MOTOR WITH MOTION CONVERSION MECHANISM
Filed May 11, 1954

INVENTOR.
WALTER P. NIBLICK.
BY
Allen & Allen
ATTORNEYS.

//united States Patent Office 2,859,362
Patented Nov. 4, 1958

2,859,362

VIBRATORY MOTOR WITH MOTION CONVERSION MECHANISM

Walter P. Niblick, Middletown, Ohio

Application May 11, 1954, Serial No. 428,900

14 Claims. (Cl. 310—21)

This invention relates to a vibration actuated electric motor. All electric motors used as prime movers today with which I am familiar operate on the basis of field windings which produce an electromagnetic field which rotates or reverses polarity so that an armature mounted within the field is caused to rotate. There are of course many different types of electric motors having various characteristics as to torque and speed.

If a prime mover is desired which has a normal slow rate of rotation of say some 100 to 500 R. P. M., it is necessary to apply to a conventional motor having the desired characteristics a gear reducer so as to reduce the speed of the output shaft to the desired slow speed. Such gear heads are quite expensive and create various other problems in connection with lubrication and the like.

Electric motors can be designed having various characteristics as to starting torque and running torque but generally speaking if a high starting torque is desired, a supplementary or starting winding must be employed together with some centrifugally actuated switch to cut out the starting winding when running speed is attained. This, of course, also adds to the cost of a motor where high starting torque is required.

In the field of vibratory motors, progress has been slow because of the characteristic noisiness and vibration of such motors. In all vibratory devices of the prior art, the vibrations have been necessarily transmitted to the base or supporting structure, and this has rendered such devices undesirable for most purposes.

There is a great need in various fields, including particularly the toy field, for a safe, simple electric motor which will run at slow speeds without costly gear reducers and it is therefore an object of my invention to provide an electric motor operating upon an entirely different principle from the conventional electric motor which will normally run at slow speeds without requiring the use of a gear head. It is another object of my invention to provide a motor as outlined above which will have a relatively high starting torque and which can be designed to have constant torque regardless of speed.

Still another object of my invention is to provide an electric motor having the desirable qualities above mentioned in which the speed can be controlled as desired and which can be made reversible. Yet another object is to provide a motor which will be completely safe in that it can be stopped while energized for an infinite length of time without the danger of burning out any windings and causing fire.

A very important object of my invention resides in the provision of a vibratory electric motor in which the vibratory parts work against each other and are suspended at a nodal point, whereby substantially no vibration is transmitted to the base or supporting structure.

These and various other objects of the invention which I shall describe in greater detail hereinafter or which will be apparent to one skilled in the art upon reading these specifications, I accomplish by that certain construction and arrangement of parts of which I shall now disclose an exemplary embodiment.

Reference is made to the drawings forming a part hereof and in which.

Figure 1:
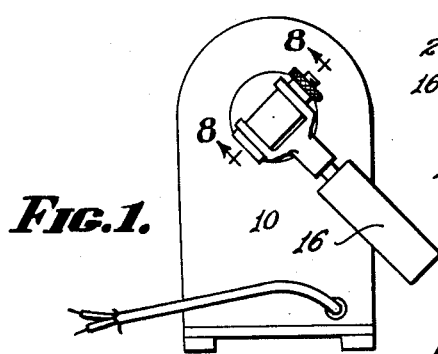
Figure 1 is an end elevational view of a motor according to my invention.

The use of fabric having uni-directional pile in connection with vibratory impulses to produce motion has been known for many years. Such a disclosure may be found, for example, in the Garbarini patent, No. 1,601,-247. This principle has been used in connection with vibratory display devices to produce animated displays but so far as I am aware, the problem of adapting this principle to a motor has never been suggested.

Briefly in the practice of my invention, I provide an external cylindrical surface and an internal cylindrical surface, one of which is fixed and the other rotatable and which surfaces are coaxially disposed one within the other. I cover one of the surfaces with a directional pile fabric, such as mohair, with the fabric running around the periphery of one of the cylindrical surfaces and directed transverse to the axis thereof. I provide means for producing oscillatory vibration of the fixed surface about its axis whereby the other surface is caused to rotate with respect to the fixed surface.

Referring now in greater detail to the drawings, the motor comprises a frame generally indicated at 10. In the specific embodiment illustrated, I have shown a standard 10a, a standard 10b and a standard 10c. The standards 10a and 10b are provided with aligned rubber bushings or grommets 11a and 11b respectively and in the bushings 11a and 11b I mount a shaft element 12. This shaft element 12 is non-rotatable but because of the resiliency of the bushings 11a and 11b, it may be oscillated slightly about its axis.

At one end of the shaft element 12 I mount a drum 13 and the same end of the shaft element 12 has an axial bore 14. To the shaft element 12 is secured a vibration imparting device indicated generally at 15 and means for varying the speed of the device indicated generally at 16.

The standard 10c may be provided with a hollow casing element 17 to which a bearing cup 18 may be secured.

A cup-like element 19 is provided with a hub 20 which is pinned to a shaft 21 as shown and the hub element 20 may have a bearing within the cup 18. The shaft 21 has a bearing in the bore 14 of the shaft element 12.

Figure 2:
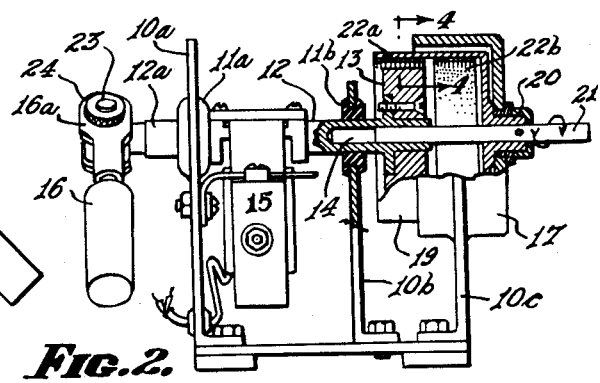
Figure 2 is a side elevational view of the same as seen from the right of Figure 1 with parts in section.
Figures 3, 4, 5:
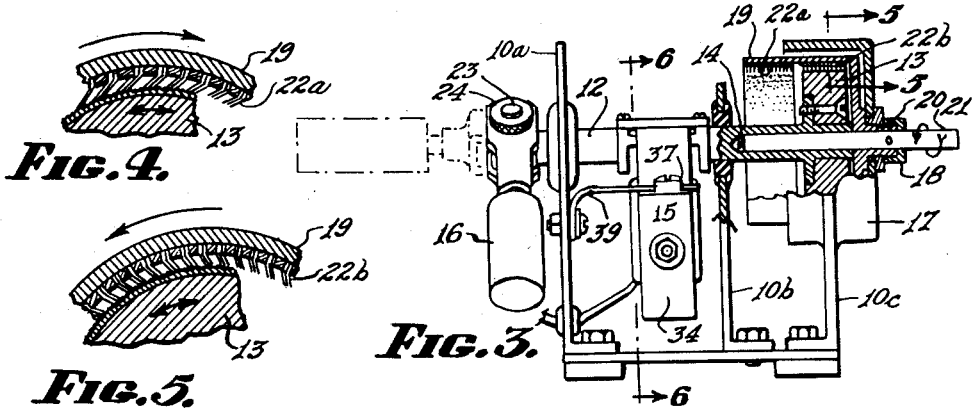
Figure 3 is a view similar to Figure 2 showing the parts in a position for reverse rotation with respect to Figure 2.
Figure 4 is a fragmentary cross sectional view taken on the line 4—4 of Figure 2 but on an enlarged scale.
Figure 5 is a fragmentary cross sectional view similar to Figure 4 taken on the line 5—5 of Figure 3.

On the inside cylindrical surface of the cup member 19 I provide two strips 22a and 22b of mohair or other suitable pile fabric material which are disposed with the pile transverse to the shaft 21 and extending in one direction around the internal cylindrical surface. The pile of the strips 22a and 22b is oppositely disposed, as best seen in Figures 4 and 5. The shaft element 12 is axially shiftable from the position of Figure 2 to the position of Figure 3 and the bore 14 is deep enough to permit such shifting movement whereby the drum 13 may be aligned with the strip 22a for rotation in one direction or the strip 22b for rotation in the other direction.

It will now be clear that if an oscillatory vibration is imparted to the shaft element 12 about its axis the drum 13 will oscillate vibrationally about its axis, as indicated by the double-ended arrows in Figures 4 and 5. The pile of the fabric at 22a or 22b, as the case may be, acts like a tremendous number of tiny ratchets so that in Figure 4, for example, with every oscillation in a clockwise direction, the member 19 will be given an impulse in a clockwise direction, while with every counterclockwise oscillation of the drum 13, the pile 22a simply slides on the surface of the drum 13. In Figure 5 of course, the impulse is given to the cup 19 with each counterclockwise oscillation. By shifting the shaft element 12 from the position of Figure 2 to the position of Figure 3, the rotation of the output shaft 21 can be reversed.

It will be observed that a portion of the shaft element 12 extends outside the standard 10a as indicated at 12a and has secured to it a member 16 by means of the fork 16a. The fork 16a is held assembled to the element 12a by a bolt 23 and nut 24 in fairly tight relation so that the member 16 may be swung from the solid line position of Figure 3 to the broken line position of this figure, or left at any intermediate position. The weight 16 affects the amplitude of the vibrations of the shaft element 12 and the speed of the motor can therefore be controlled by swinging the member 16 from one position to the other, as shown in Figure 3. In the broken line position of this figure, the weight 16 is substantially coaxial with the shaft element 12 and has a minimum effect on the amplitude of the vibrations of the shaft element so that the motor will rotate at its maximum speed. When the member 16 is swung to the solid line position, the maximum effect is obtained and the motor will run its minimum speed. It will be understood that any given motor will have a fundamental minimum and maximum speed and this will be based on considerations of the quality of the shaft element 12 and details of design of the electromagnet and armature. Thus, for example, an electric motor may be designed according to the present invention having a minimum speed of say 1 R. P. M. and a maximum speed of say 12 R. P. M. Likewise, it is possible to design a motor having a minimum speed of say 30 R. P. M. and a maximum speed of say 360 R. P. M.

Figures 6, 7, 8:
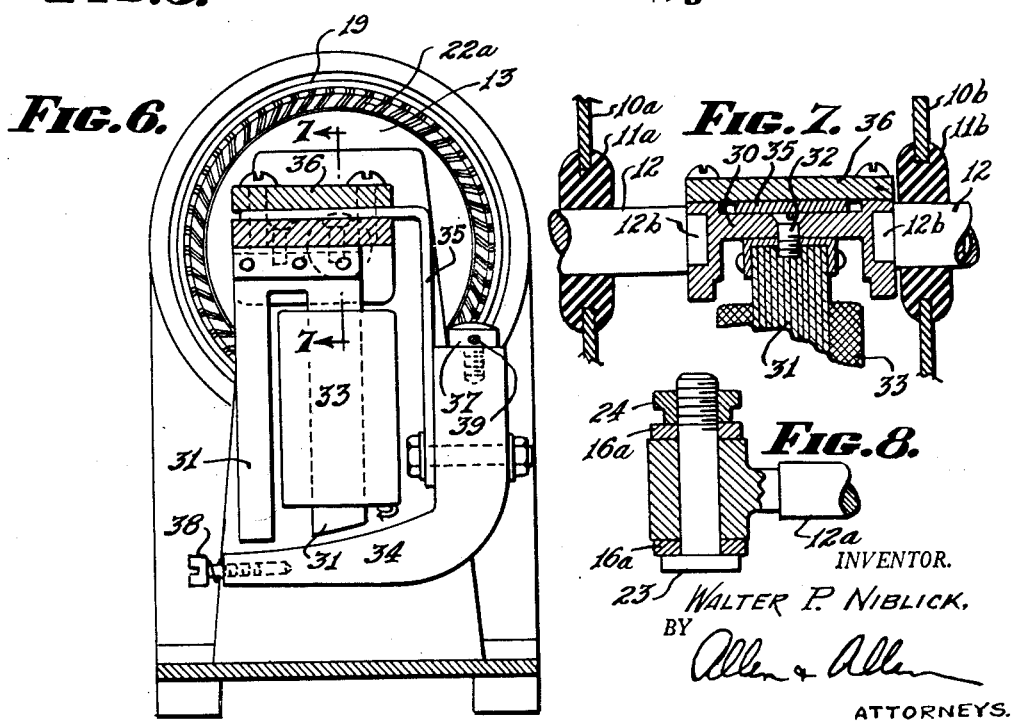
Figure 6 is a cross sectional view taken on the line 6—6 of Figure 3 on an enlarged scale.
Figure 7 is a fragmentary cross sectional view taken on the line 7—7 of Figure 6.
Figure 8 is a fragmentary cross sectional view on an enlarged scale taken on the line 8—8 of Figure 1.

The oscillation of the shaft element 12 is achieved as shown in Figures 6 and 7. In these figures, the shaft element 12 is shown as being discontinuous with a structure 30 connecting the two portions thereof. The ends of the two shaft portions 12 are reduced as at 12b and fit tightly in recesses in the member 30. It will, of course, be understood that instead of the specific structure shown, the shaft 12 could be continuous with a flat provided in place of the member 30.

The electromagnet core 31 is secured to the member 30 by means of a screw 32 or the like and an electromagnet coil 33 is wound thereon. The armature indicated generally at 34 is secured in any desired manner to a spring element 35 which is clamped to the member 30 by means of the clamping plate 36. A screw may be provided as at 38 for adjusting the natural fundamental frequency of the armature. It will be understood that this screw may be screwed farther in or farther out and, as a matter of fact, screws having different weights may be factory installed at 38 and may be adjustable so that the purchaser may vary the frequency.

In the particular embodiment shown, the screw 37 has a bore which engages a guide wire 39 to prevent rotation of the electromagnet and armature structure.

It will be observed that the pole ends of the electromagnet core 31 are angularly arranged and that the armature 34 is also angularly arranged. The result of this construction is that when the electromagnet 33 is energized by an alternating current, the armature 34 is alternately attracted and repelled by the pole pieces 31 with the thrust being at an angle to the vertical. Since the entire electromagnet and armature structure is clamped to the shaft element 12, this shaft element is subjected to oscillatory vibrations when the electromagnet is energized. I have found that best results are obtained when the axis of the pole pieces 31 is not on the axis of the shaft element 12. This will be clear from a consideration of Figure 6 and it will be understood that the relationship between these parts may be varied to produce different results.

The structure comprising the core 31 and armature 34 has been found to have a number of nodal points. This may be determined by laying the core-armature assembly on a piece of foam rubber, for example, and energizing the electromagnet. If the assembly is then examined by stroboscopic light, the nodal points where there is substantially no vibration may be spotted. In practice, the axis of the shaft 12 will be at one nodal point and the hole for the rod 39 will be at another nodal point. In this way vibration of the structure as a whole is minimized, and the core and armature vibrate about the axis of the shaft 12 in the manner of a pair of scissors about their pivot pin. The shaft 12 is thus subjected to oscillatory vibrations about its own axis. For this reason also, a motor according to my invention is substantially unaffected by any vibration of any apparatus upon which it may be mounted. Vibrations in any given plane might well be duplicated by the apparatus upon which a motor is mounted, and such vibration would affect the operation of the vibratory motor. However, the vibration of the shaft 12 would never be duplicated or even approximated, and therefore my motor is unaffected by the vibration of any machine or device upon which it may be mounted.

It will be clear from what has been said above that numerous changes may be made without departing from the spirit of my invention and I therefore do not intend to limit myself otherwise than as set forth in the claims which follow.

Having now fully described my invention, what I claim as new and desire to secure by Letters Patent is:

1. A vibration actuated electric motor comprising a frame, a shaft element resiliently but non-rotatably mounted in said frame, said shaft element at one end having an axial bore and carrying non-rotatably at said end a drum, a rotatable shaft having a bearing in said frame at one end and having a bearing in the bore of said shaft element, said rotatable shaft having fixed thereto a cup having an inside substantially cylindrical surface annularly spaced from the external cylindrical surface of said drum, one of said cylindrical surfaces being covered with a unidirectional pile fabric, said fabric being arranged with the pile direction transverse to the axes of said drum and cup, the pile of the fabric on one of said surfaces being in snug contact with the other of said surfaces, and electromagnetic means associated with said shaft element for producing a vibratory oscillation of said shaft element about its axis.

2. An electric motor according to claim 1, wherein said cup is lined with the pile fabric.

3. An electric motor according to claim 1, in which that one of said cylindrical surfaces carrying said pile fabric is of substantially twice the axial extent of the other and carries two annular strips of said pile fabric side by side axially of said cup, said strips being arranged with their pile extending in opposite directions, and means for axially shifting one of said surfaces with respect to the other to bring the uncovered cylindrical surface into operative engagement with one or the other of said strips of pile fabric to reverse the direction of rotation of said motor.

4. An electric motor according to claim 1, wherein said cup is substantially twice the axial extent of said drum and carries two annular strips of said pile fabric side by side axially of said cup with the pile of said strips extending in opposite directions, and means for axially shifting said drum with respect to said cup to bring said drum into engagement with one or the other of said strips of fabric to reverse the direction of rotation of said motor.

5. A motor according to claim 1, wherein means are associated with said shaft element to vary the amplitude of vibration of said shaft element to change the speed of rotation of said motor.

6. A motor according to claim 5, wherein a weight is secured to said shaft element and means are provided for changing the position of said weight in relation to the axis of said shaft element.

7. A motor according to claim 6, wherein said weight is mounted on a lever pivoted to said shaft and capable of being positioned in any relationship to said shaft element between a coaxial position and a transverse position.

8. A motor according to claim 1, wherein said electromagnetic means comprises an electromagnet comprising a core having pole pieces and a coil on one of said pole pieces, and an armature for said electromagnet fixed to said shaft element, the ends of the pole pieces of said electromagnet and the armature being disposed at an angle to the axis of said coil.

9. An electric motor according to claim 8, wherein an adjustable weight is provided to vary the amplitude of vibration of the armature.

10. An electric motor according to claim 9, wherein the axis of the electromagnet coil does not intersect the axis of said shaft element.

11. An electric motor according to claim 1, wherein said shaft element is disposed with its axis substantially on a nodal point of said electromagnetic means.

12. An electric motor according to claim 1, wherein said electromagnetic means comprises an electromagnet comprising a core having pole pieces and a coil on one of said pole pieces, and an armature for said electromagnet fixed to said shaft element, the axis of said shaft element coinciding with a nodal point of said structure, the ends of the pole pieces of said electromagnet and the armature being disposed at an angle to the axis of said coil.

13. In a vibration actuated electric motor, a frame, a shaft element resiliently but non-rotatably mounted in said frame, an electromagnet comprising a core having pole pieces and a coil on one of said pole pieces, and an armature for said electromagnet fixed to said shaft element, the ends of the pole pieces of said electromagnet and the armature being disposed at an angle to the axis of said coil, and the axis of said coil being normal to said shaft element, whereby to produce a vibratory oscillation of said shaft element about its axis.

14. In a vibration actuated electric motor according to claim 13, said electromagnet and armature assembly being fixed to said shaft element substantially at a nodal point of said assembly, whereby substantially no vibration is transmitted to said frame.

References Cited in the file of this patent

UNITED STATES PATENTS

| | | |
|---|---|---|
| 1,600,088 | Burstyn | Sept. 14, 1926 |
| 1,836,748 | Carley | Dec. 15, 1931 |
| 2,437,904 | Adams | Mar. 16, 1948 |
| 2,494,760 | Hush | Jan. 17, 1950 |
| 2,499,632 | Coake | Mar. 7, 1950 |

FOREIGN PATENTS

| | | |
|---|---|---|
| 661,589 | Great Britain | Nov. 21, 1951 |